United States Patent [19]

Kishi et al.

[11] 4,096,201

[45] Jun. 20, 1978

[54] ADHESIVE COMPOSITION

[75] Inventors: Ikuji Kishi; Tatsuo Nakano; Hiroshi Okai, all of Machida, Japan

[73] Assignee: Denki Kagaku Kogyo Kabushiki Kaisha, Tokyo, Japan

[21] Appl. No.: 757,281

[22] Filed: Jan. 6, 1977

[30] Foreign Application Priority Data

Jun. 29, 1976   Japan .................................. 51-76718

[51] Int. Cl.$^2$ ........................................... C08F 279/02
[52] U.S. Cl. .................................................... 260/879
[58] Field of Search ........................................... 260/879

[56] References Cited

U.S. PATENT DOCUMENTS

| | | | |
|---|---|---|---|
| 3,725,504 | 4/1973 | Owston | 260/879 |
| 3,758,439 | 9/1973 | Fodor | 260/879 |
| 3,832,274 | 8/1974 | Owston | 260/879 |

*Primary Examiner*—Paul R. Michl

*Attorney, Agent, or Firm*—Oblon, Fisher, Spivak, McClelland & Maier

[57] ABSTRACT

An adhesive composition comprises a redox system comprising a reducing agent and an oxidizing system comprising a. 5 to 30 wt. parts of an elastomer of a copolymer of butadiene and acrylonitrile or a copolymer of butadiene and acrylonitrile and less than 5 wt.% of a functional monomer or a graft copolymer of butadiene and at least one of acrylonitrile, styrene and methacrylic acid ester and b. 70 to 95 wt. parts of a monomer mixture comprising 30 to 80 wt.% of 2-hydroxy ethyl methacrylate or 2-hydroxy propyl methacrylate and 20 to 70 wt.% of a $C_{1-4}$ alkyl methacrylate to total monomers having ethylenically unsaturated double bond and c. 0.1 to 10 wt.% of an organic hydroperoxide to total monomers having ethylenically unsaturated double bond.

14 Claims, No Drawings

ADHESIVE COMPOSITION

BACKGROUND OF THE INVENTION

1. Field of the Invention

The present invention relates to an improved adhesive composition which can be quickly hardened under exposing to air and has high impact strength. More particularly, it relates to an adhesive composition which minimizes the toxicity caused by inhalation in the handling of the adhesive composition and imparts high adhesive strength to a wood and a metal and can be hardened for several to several tens minutes of the time for imparting enough strength for handling.

2. Description of the Prior Art

Anaerobic adhesive compositions (the bending operation should be conducted without contacting it with air) comprising a polyacryl type monomer and an anaerobic monomer have been known as the adhesive composition comprising an acryl type monomer.

The anaerobic adhesive compositions comprising a monomer whose polymerization is easily inhibited with oxygen in air, can be stored at room temperature even though a peroxide as a polymerization initiator is added to the adhesive composition because of the inhibition of polymerization with oxygen in air.

The anaerobic adhesive composition can be used by hardening it under air-tightening between adhered metal substrates or by hardening it by contacting it on a surface coated with a hardening accelerator.

In both cases, the edge part of the adhesive composition exposed to air is not hardened. Accordingly, the unhardened part of the adhesive composition should be taken off by a complicated operation such as to wipe out with a solvent after the hardening. When the operation for taking out the unhardened part is omitted, various disadvantages on the appearance of product and the environmental hygiene such as the adhesion on hand and cloth, the dust adhesion or the smell have been caused.

When the adhesive composition is easily exposed to air in the form of the adhered substrates such as the space of the adhered substrates is wide, or the adhered substrate is paper, cloth or a cut surface of wood or a foamed substrate e.g. sponge, the fatal disadvantages of unhardening and remarkably low adhesive strength which leads to inferior adhesion are caused. Accordingly, the kinds of the adhered substrates are quite limited, disadvantageously.

It has been known to combine an acryl ester monomer having less anaerobic property and an elastomer for imparting enough impact strength to prepare adhesive compositions.

In the polychloroprene type adhesive compositions of U.S. Pat. No. 2,981,650, the oxidizing agent for the redox catalyst was mixed, at the time of application, with the solution of the reducing agent for the redox catalyst and the polychloroprene and the liquid monomer having unsaturated double bond, whereby the hardening was attained.

In the case of U.S. Pat. No. 3,333,025, the peroxide was mixed, at the time of application, with the system prepared by adding the reducing agent for the redox catalyst to a syrup produced by partially polymerizing the liquid monomer having unsaturated double bond in the presence of polychloroprene etc. whereby the hardening was attained.

In the cases of the above-mentioned adhesive compositions, it has been taken a long period for hardening the adhesive compositions and it has been usual to measure the adhesive strength, 24 hours after the application.

Recently, the needs of the increase of the hardening speed and the improvement of processibility for a bonding operation have been increased and are indispensable factors for preventing the smell and the environmental pollution caused by vaporized components in the condition of unhardening for a long period, and for applying it to an automatic lines for the bonding operation.

It has been known to add methacrylic acid to the polychloroprene-vinyl monomer system as disclosed in U.S. Pat. No. 3,725,504 in order to improve the set time.

The impact strength has been low because of the polychloroprene-vinyl monomer partial polymer.

It has been known to add a peroxide to the adhesive composition comprising an elastomer of butadiene and the other monomer, a methacrylic acid ester monomer, methacrylic acid and a reducing agent for a redox catalyst to attain the hardening in U.S. Pat. No. 3,832,274.

However, in the adhesive composition comprising the main components of the methacryl type monomers which have relatively low anaerobic property, the stability in the storage of the adhesive composition is remarkably decreased by the addition of the peroxide as the oxidizing agent for the redox catalyst, to the monomer solution. Accordingly, it has been usual to mix the peroxide, at the time for application, with the adhesive composition containing a reducing agent for a redox catalyst in the conventional technology.

It has been disclosed to use the peroxides dissolved in a plasticizer such as dioctyl phthalate in U.S. Pat. No. 2,894,932, U.S. Pat. No. 2,981,650, U.S. Pat. No. 3,321,351 and U.S. Pat. No. 3,333,025.

It has been also known to use the composition of a glass-like organic polymer, an initiator catalyst and a solvent as an under-coat in Japanese Unexamined Patent Publication No. 47,425/1974.

It has been known to add a peroxide for the redox catalyst to the composition containing ethylenically unsaturated monomer as the methyl methacrylate composition containing benzoyl peroxide in U.S. Pat. No. 3,321,351. However, these compositions are not stable in the storage and are not to be practically used. (Japanese Unexamined Patent Publication No. 47425/1974).

When methacryl acid is used at high content such as 5 wt. % to 20 wt. %, the corrosion of metal is disadvantageously caused as the cases of U.S. Pat. No. 3,725,504 and U.S. Pat. No. 3,832,274. When methacrylic acid is contacted on a metal surface or is vaporized, the corrosion of the metal is easily caused, especially the corrosion of copper material used in an electrical apparatus which leads to disconnect a copper wire etc., whereby a serious failure is caused.

In Japanese Unexamined Patent Publication No. 97051/1974, it has been disclosed the fact that when an unsaturated organic acid is contained and the adhered product is exposed in severe environmental condition, rapid deterioration is caused.

Moreover, on the handling of an adhesive composition, when the adhesive composition is adhered on a skin of hand and foot, an inflammation of the skin may cause. Accordingly, the presence of methacrylic acid in the adhesive composition is not advantageous in the bonding operation.

SUMMARY OF THE INVENTION

It is an object of the present invention to overcome the above-mentioned various disadvantages and to provide an adhesive composition which imparts remarkably high impact strength and less corrosion of a metal and is not anaerobic and can be applied for various substrates and has less unevenness for hardening and is suitable for the bonding operation environment and can be hardened within several to several tens minutes of the time for imparting enough strength for handling.

DETAILED DESCRIPTION OF THE PREFERABLE EMBODIMENTS

In the adhesive composition of the present invention, an anaerobic monomer of 2-hydroxy ethyl methacrylate (2-HEMA) or 2-hydroxy propyl methacrylate (2-HPMA) and a monomer having less anaerobic property of a $C_{1-4}$ alkyl methacrylate are used and a hydroperoxide is added as one of the important component to the oxidizing system for the adhesive composition to overcome the disadvantages of the conventional anaerobic adhesive composition and the non-anaerobic adhesive composition.

It is possible to obtain the adhesive composition which imparts remarkably high impact strength and less unevenness for hardening which could not be attained by the conventional adhesive compositions of the elastomer, methacrylic acid ester and the other unsaturated vinyl compound.

In the case of the anaerobic adhesive compositions used for bonding two substrates with wide gap, there is possibility to expose it to air. Accordingly, a failure of bonding is easily caused, disadvantageously.

When a non-anaerobic adhesive composition is used in the conventional technology using the under-coat of benzozyl peroxide etc., the allowable gap between the substrates is not wide as different from the adhesive composition containing the hydroperoxide. When the bonding area is broad, remarkable unevenness for hardening may be caused as different from the adhesive composition of the invention, whereby enough function as the adhesive composition could not be attained.

In accordance with the adhesive composition of the present invention, the hardening can be resulted even though the ratio of the oxidizing system to the reducing system for the adhesive composition is varied. The hardening can be attained by a simple contact or mixing operation and high freedom and advantages can be attained in a design of a dispenser used for the bonding operation.

As the unexpected result, remarkably high impact strength can be imparted by adding the hydroperoxide to the main components in comparison with the low impact strength in the conventional case of under-coat of benzoyl peroxide.

The adhesive compositions of the present invention comprise the following components.

A. The elastomers used in the invention include copolymers of butadiene and acrylonitrile and modified copolymers of butadiene and acrylonitrile and less than 5 wt. % of a functional monomer, which can be methacrylic acid, acrylic acid, maleic anhydride, itaconic acid, etc.

The elastomers preferably comprise the following components. (percent by weight)

| Acrylonitrile component | 5.0 to 60 preferably 15 to 50 |
| Butadiene component | 95 to 40 preferably 85 to 50 |

When the hydroperoxide used in the invention is added to the composition comprising polychloroprene and a monomer having ethylenically unsaturated double bond, the stability in the storage is remarkably inferior to disadvantageously harden at the room temperature for several days.

Homopolymers of butadiene and copolymers of butadiene and styrene are excluded because they are not suitable in the composition containing the compound having ethylenically unsaturated double bond from the viewpoint of the solubility and the stability of viscosity after dissolving it.

The graft copolymers used in the invention include graft copolymers of butadiene and at least one monomer selected from the group consisting of acrylonitrile, styrene and methacrylic acid ester. The graft copolymer is prepared by graft-polymerizing a monomer selected from the group consisting of acrylonitrile, styrene and methacrylic acid ester on an elastomer of homopolymer of butadiene or a copolymer of butadiene and at least one monomer selected from the group consisting of acrylonitrile, styrene and methacrylic acid ester.

The graft copolymers preferably comprise the following components. (percent by weight)

| Butadiene component | 20 to 70 preferably 25 to 65 | 10 to 70 preferably 20 to 65 |
|---|---|---|
| Styrene component | 15 to 70<br>20 to 65 | 5 to 80 preferably 10 to 70 |
| Acrylonitrile component | 5 to 40<br>10 to 35 | 0 to 30 preferably 0 to 20 |
| Alkyl acrylate, component | — | 5 to 80 preferably 10 to 70 |

The graft copolymers advantageously impart improved impact strength and peeling strength and also viscosity increasing effect to give a desired viscosity for handling them as the adhesive composition.

When the graft copolymer is used, thixotropic property is given to reduce the phenomenone of thread forming in the bonding operation and to improve the efficiency of the operation.

Thus, when the acrylonitrile-styrene-butadiene type graft copolymers having no alkyl acrylate component are used, the adhesive compositions easily cause a gelation. The gelation can be prevented by an addition of a polymerization inhibition or an antioxidant.

When the butadiene-styrene-methyl methacrylate type graft copolymers or the butadiene-styrene-methyl methacrylate-acrylonitrile type graft copolymers are used, the adhesive compositions maintain stable viscosity without a gelation in the storage thereof.

The elastomer and the graft copolymer need not to be completely dissolved but should be finely dispersed in the components of the composition.

The elastomer and the graft copolymer is usually used in a range of 5 to 30 wt. % preferably 10 tp 25 Wt. % to total components of the elastomer, the graft copolymer and the monomers depending upon the purpose of the application thereof.

When the content of the elastomer and the graft copolymer is less than 5 wt.%, the viscosity is low to result a glass-like hardened adhesive composition and high impact strength and peeling strength required as a desired adhesive composition can not be obtained.

When the content of the elastomer and the graft copolymer is more than 30 wt. %, the viscosity is too high and the dissolving or dispersing operation is difficult and the bonding operation and the blending operation of two compositions are disadvantageously difficult.

B. The methacrylic acid esters having hydroxyl group include 2-hydroxy ethyl methacrylate (2-HEMA) and 2-hydroxy propyl methacrylate (2-HPMA). These liquid monomers have been known as the anaerobic monomer.

The 2-HEMA or 2-HPMA is usually used in a range of 80 to 30 wt. % to total monomer having ethylenically unsaturated double bond.

When the content thereof is more than 80 wt. %, the adhesive composition is not hardened in air to be unsatisfactory for the purpose of the invention.

When the content thereof is less than 30 wt.%, the hardening speed is slow to be disadvantageous in the practical application.

The hardening speed is increased depending upon the increase of the content of 2-HEMA and 2-HPMA.

C. The monoalkyl methacrylate having a $C_{1-4}$ alkyl group used in the invention is usually used in a range of 20 to 70 wt. % to total monomers having ethylenically unsaturated double bond.

When the content thereof is more than 70 wt. %, the hardening speed is too low in the practical use and the smell is strong during the bonding operation to be disadvantageous in the environmental hygiene, on the contrary to the purpose of the invention.

When the content thereof is less than 20 wt.%, the hardening in air is not enough to be disadvantageous.

In order to improve the hardening in air, it is possible to add paraffin wax. It is preferable to use a paraffin wax having a melting point of 40° to 100° C. preferably 40° to 80° C. The paraffin wax is usually used in a range of 0.01 to 2 wt. % to total components of the adhesive composition.

When the content thereof is less than 0.01 wt. %, the hardening at the surface exposed to air is too low. When the content thereof is more than 2 wt. %, the adhesive strength may be decreased.

When the content of the alkyl methacrylate is small, it is preferable to add the paraffin wax.

When the paraffin wax is not added, sometimes it takes 1 to 2 days for hardening the edge part of the adhesive composition exposed to air.

Besides the monomers used in (B) and (C), it is possible to use the other monomer having ethylenically unsaturated double bond in a range of the amounts defined in (B) and (C) (less than 50 wt. %).

The monomers having ethylenically unsaturated double bond include (meth)acrylic acid esters such as methyl-, ethyl-, n-butyl-, isobutyl- and 2-ethylehexyl-acrylates and 2-ethylhexyl-, cyclohexyl-, and lauryl-methacrylates, methacrylic acid, acrylic acid, glycidyl methacrylate, triethyleneglycol dimethyacrylate, tetraethylene glycol; vinyl acetate, styrene, divinyl benzene, acrylonitrile and methacrylonitrile. These monomers are only exemplifications.

D. The hydroperoxides used in the invention include t-butyl hydroperoxide, pinene hydroperoxide, paramenthan hydroperoxide, diisopropyl hydroperoxide, cumene hydroperoxide, diisopropyl hydroperoxide and benzene hydroperoxide.

It is possible to use an organic peroxide besides the hydroperoxides. However, the hydroperoxide is used as one of the indispensable components because the impact strength is high and the unevenness of hardening is small after the hardening the adhesive composition.

The hydroperoxide is usually used in a range of 0.1 to 10 wt. % to total monomers having ethylenically unsaturated double bond.

When the content thereof is less than 0.1 wt. %, the hardening is not enough and the adhesive strength is too low. When the content thereof is more than 10 wt. %, the stability in storage of the adhesive composition is too low.

In order to improve the stability in storage of the adhesive composition, a small amount of a polymerization inhibitor is usually added to it.

The polymerization inhibitors can be the conventional polymerization inhibitors such as hydroquinone, catechol, methyl hydroquinone, hydroquinone monomethyl ether, p-benzoquinone, picric acid phenothiazine, A-butyl catechol, 2-butyl-4-hydroxyanisole, 2,6-di-t-butyl-p-cresol, etc..

The polymerization inhibitor is usually used in range of 0.001 to 3 wt. % preferably 0.01 to 1 wt. % to total monomers having ethylenically unsaturated double bond.

When the content thereof is lower, the stability in storage is inferior. When the content thereof is higher, the adhesive strength is lowered.

It has been known that the stability in storage is remarkably decreased by an addition of an organic peroxide to a vinyl compound. However, in the case of the adhesive composition of the invention, the stability of the adhesive composition is remarkably high though the relatively large amount of the hydroperoxide is added. When 0.05 wt. % of hydroquinone was added as the polymerization inhibitor, the adhesive composition was stable without significant increase of viscosity for longer than 6 months at 23° C.

In the invention, a reducing agent for the redox catalyst is added as a hardening accelerator to the composition containing the hydroperoxide just before the bonding operation to impart the hardening in order to accelerate the decomposition of the hydroperoxide to easily form the radicals.

a. The hardening accelerator can be coated on a substrate as an under-coat before applying the oxidizing system, with or without dissolving it into a solvent or a plasticizer such as acetone, methyl ethyl ketone, methylisobutyl ketone, ethyl acetate, butyl acetate, benzene, toluene, methanol, ethanol, dioctyl phthalate and dibutyl phthalate.

b. The hardening accelerator is dissolved into a liquid monomer having ethylenically unsaturated double bond and the solution is contacted with the other components containing the hydroperoxide to harden the composition.

In the case of (b), the amounts of the components in both of the mixture containing the hydroperoxide and the mixture containing the reducing agent, should be in the ranges defined above. Accordingly, the components in the oxidizing system containing hydroperoxide and the components in the reducing system containing the reducing agent can be selected as desired. It is possible to use the components of the elastomer, the graft copolymer and the monomers in the various viscosities and various ratios of components and with different components whereby the adhesive compositions suitable for the type of the substrate can be prepared. Accordingly, the adhesive composition can be applied in wide ranges.

The adhesive composition in the case of (b) does not contain any solvent. Accordingly, the disadvantageous step for drying the hardening accelerator after coating it is not found and the environmental pollution caused by a solvent can be prevented and the loss of the solvent can be prevented to be preferable method.

The reducing agents used in the invention include metallic soap such as cobalt naphthenate, diethyl-p-toluidine, diisopropanol-p-toluidine or thioamides such as thiourea, acetyl thiourea, tetramethyl thiourea, ethylene thiourea, mercaptobenzoimidazole etc.

It is preferable to use thioamides from the viewpoint of high hardening speed.

The invention will be further illustrated by certain examples. In the specification, the terms of part and percentage means part by weight and percentage by weight.

EXAMPLE 1

In the example, various adhesive compositions were prepared by using various contents of 2-hydroxy ethyl methacrylate (2-HEMA) and various contents of methyl methacrylate (MMA), as typical components and a reducing agent for a redox catalyst was used as the under-coat and the hardening time thereof were measured.

In the preparation of the adhesive composition, the specific amounts of MMA, 2-HEMA and butadiene-nitrile rubber were charged in a 1 liter glass flask and each mixture was stirred at 30° C for 30 hours to prepare each uniform translucent mixture and the catalyst and the additive were further added and the mixture was further stirred for 30 minutes to form each oxidizing system of the adhesive composition. The components blended were stated in Table 1.

In the examples, the following symbols are used.
B: butadiene
AN: acrylonitrile
S: styrene
(the ratio of B, An or S is shown as weight percent)
BPO: benzoyl peroxide
Har time: hardening time Table 1

| Sample No. | MMA (wt. part) | 2-HEMA (wt. part) | MMA/2-HEMA |
|---|---|---|---|
| a | 68.0 | 17.0 | 80/20 |
| b | 59.5 | 25.5 | 70/30 |
| c | 51.0 | 34.0 | 60/40 |
| d | 42.5 | 42.5 | 50/50 |
| e | 34.0 | 51.0 | 40/60 |
| f | 25.5 | 59.5 | 30/70 |
| g | 17.0 | 68.0 | 20/80 |
| h | 8.5 | 76.5 | 10/90 |

Common condition:
15 wt. parts of butadiene-nitrile rubber (Trade name Hycar 1042)
(B.F. Goodrich Chemical Co.); 0.3 wt. part of paraffin; 8 wt. parts of cumene hydroperoxide.
(Hycar 1042: butadiene-nitrile rubber (B : AN = 67% : 33%)

The reducing agent for the redox catalyst was applied as a solution (p-2) (a reducing system of the adhesive composition) prepared by dissolving 12 wt. parts of tetramethylene thiourea in 100 wt. parts of ethanol.

The Har time of the adhesive composition was mesured as follows. The solution (p-2) was coated on a cold rolled steel plate which was treated by the sand blast method, and was dried at the room temperature for 5 minutes (21° C, 55% RH) and then each adhesive composition (oxidizing system) was coated on it in a thickness of about 1 mm and then, the period from the coating to the initiation of hardening after losing tackiness under contacting with a finger was measured. The period was referred as the Har time. The results were as follows.

Table 2

| Har.time of Adhesive composition | | | | | | |
|---|---|---|---|---|---|---|
| Sample No. | a | b | d | f | g | h |
| Har.time (min.) | 30 | 20 | 15 | 5 | 20 | no hardening |

From the results shown in Table 2, when the content of MMA is more than 80 wt. %, the hardening speed was remarkably slow and the purpose of the invention could not be attained. When the content of 2-HEMA is 90 wt. %, the hardening could not be resulted in the condition exposed to air.

EXAMPLE 2

In accordance with the process of Example 1 except using each reducing system of the reducing agent for the redox catalyst in the form of the composition similar to the main adhesive composition as shown in Table 3 to form hardening compositions for both of the oxidizing system and the reducing system of the redox catalyst, the Har. time under blending them was measured. The results are in Table 3'.

Table 3

| Composition of Reducing system | | | |
|---|---|---|---|
| Sample No. | MMA (Wt. part) | 2-HEMA (wt. part) | MMA/2-HEMA (wt. ratio) |
| a' | 68.0 | 17.5 | 80/20 |
| b' | 59.5 | 25.5 | 70/30 |
| c' | 51.0 | 34.0 | 60/40 |
| d' | 42.5 | 42.5 | 50/50 |
| e' | 34.0 | 51.0 | 40/60 |
| f' | 25.5 | 59.5 | 30/70 |
| g' | 17.0 | 68.5 | 20/80 |
| h' | 8.5 | 76.5 | 10/90 |

Common conditions:
15 wt. parts of butadiene-nitrile rubber (Hycar 1042);
0.3 wt. part of paraffin;
2 wt. parts of ethylene thiourea.

Table 3'3'

| Har.time in two composition type adhesive composition | | | | | | | | |
|---|---|---|---|---|---|---|---|---|
| Combination of samples | a/a' | b/b' | c/c' | d/d' | e/e' | f/f' | g/g' | h/h' |
| Har.time (min.) | >30 | 20 | 15 | 10 | 8 | 5 | 15 | no hardening |

As the results, it was found that excellent hardening speeds could be attained by using the adhesive compositions in the ranges of the components of the invention even though both of the oxidizing system and the reducing system as the redox catalyst contained the monomers having the ethylenically unsaturated double bond.

EXAMPLE 3

Two sheets of cold rolled steel plate having a size of 100 × 25 × 1.6mm which were treated by the sand blast method, were bonded by coating the samples of Example 1 and Example 2 on the area of 25 × 20mm. The period from the contact to the time of non-movement of the steel plate by hand was measured as the set time. The results are shown in Table 4.

Table 4

Set time in adhesion of steel plates (at 20° C)

| Sample No. | Set time (min.) | Sample | Set time (min.) |
|---|---|---|---|
| a/a' | >30 | a/p-2 | >30 |
| b/b' | 15 | b/p-2 | 17 |
| c/c' | 8 | d/p-2 | 7 |
| d/d' | 6 | f/p-2 | 4 |
| e/e' | 5 | g/p-2 | 3 |
| f/f' | 4 | | |
| g/g' | 3 | | |

The following facts were found. In the case of the bonding of steel plates, the set time was remarkably short as different from that of the condition exposed to air.

In the ranges of the components of the invention the processibility of the adhesive compositions was remarkably improved.

The set time was shortened depending upon the increase of the anaerobic component of 2-HEMA.

EXAMPLE 4

In accordance with the process of Example 1, various adhesive compositions were prepared by using the components shown in Table 5.

Table 5

| Sample No. | NBR Hycar 1072 (wt. part) | MMA (wt. part) | 2-HEMA (wt. part) |
|---|---|---|---|
| 1 | 13.8 | 43.1 | 43.1 |
| 2 | 13.8 | 25.8 | 60.4 |
| 3 | 16.4 | 41.8 | 41.8 |
| 4 | 16.4 | 25.1 | 58.5 |

(Hycar 1072: butadiene-nitrile rubber)
(B:AN = 67%:33% carboxyl group 1 mole %)
Common conditions:
0.3 wt. part of paraffin
8 wt. parts of cumene hydroperoxide (CHP)

The solution (p-2) of the reducing agent used in Example 1 was coated on a steel plate and a steel piece which were respectively treated by the sand blast method and was dried at 20° C in 50% RH (relative humidity) for 5 minutes, and then each adhesive composition shown in Table 5 was coated on it in a thickness of 0.1mm and the steel piece was bonded to the steel plate. After leaving the specific period, the lap shear strength (speed of 10 mm/min.) the Izod impact strength and T shape peeling strength (speed of 50 mm/min.) were measured in accordance with the Japanese Industrial Standard. The results are shown in Table 6.

Table 6

| | | Adhesive strength | | |
|---|---|---|---|---|
| Sample No. | Reducing agent | Lap shear strength (kg/cm$^2$) 10 min. | Lap shear strength (kg/cm$^2$) 24 hrs. | Izod impact strength (kg/cm$^2$) 24 hrs. | Peeling strength (kg/cm$^2$) 24 hrs. |
| No. 1 | p-2 | 45 | 250 | 14 | 7.5 |
| 2 | p-2 | 110 | 271 | 15 | 8.8 |
| 3 | p-2 | 60 | 265 | 20 | 10.5 |
| 4 | p-2 | 115 | 270 | 21 | 11.3 |

The adhesive compositions imparted high hardening speed and high adhesive properties of excellent impact strength and peeling strength.

EXAMPLE 5

In the example, the butadiene-styrene-acrylonitrile graft copolymer (ABS graft copolymer) was used instead of butadiene-nitrile rubber (NBR). Each adhesive composition was prepared in accordance with the process of Example 1. The adhesive characteristics were measured as those on Example 4 and were shown in Table 7.

Table 7

| Sample No. | 5 | 6 | 7 | 8 |
|---|---|---|---|---|
| ABS graft copolymer | 18 | 18 | 22 | 22 |
| MMA | 41 | 24.6 | 39.0 | 23.4 |
| 2-HEMA | 41 | 57.4 | 39.0 | 54.6 |
| CHP | 8 | 8 | 8 | 8 |
| Lap shear strength kg/cm$^2$ 10 min. | 21 | 45 | 38 | 70 |
| 24 hrs. | 312 | 320 | 280 | 285 |
| Impact strength (kg cm/cm$^2$) 24 hrs. | 12.2 | 16.5 | 15.5 | 18.0 |
| Peeling strength (kg/25mm) 24 hrs. | 5.0 | 5.0 | 9.5 | 9.8 |

Common condition:
Solution of reducing agent: p-2
ABS graft copolymer: graft copolymer powder manufactured by Denki Kagaku Kogyo K.K.
(AN:S:B : 18 : 42 : 40)

When the samples Nos. 5, 6, 7 and 8 were respectively stored at 10° C, the sols were formed one month later.

When the same samples were respectively stored at 30° C, the gelations were caused under the increase of viscosity 2 days later.

EXAMPLE 6

In the example, a graft copolymer of butadiene-styrene-methyl methacrylate-acrylonitrile (MBAS) (MMA : B : N : S = 17.9 : 41.7 : 2.7 : 37.7) (BL-20 manufactured by Denki Kagaki Kogyo K.K.) was used instead of the NBR and each reducing system was prepared by using the components shown in Table 8. The reducing system was combined with the oxidizing system. The adhesive strengths of each adhesive composition prepared by blending, reducing system and the oxidizing system are shown in Table 9.

Table 8

| Sample No. | MBAS (wt. part) | MMA (wt. part) | 2-HEMA (wt. part) |
|---|---|---|---|
| 9 | 18 | 41.0 | 41.0 |
| 10 | 18 | 24.6 | 57.4 |
| 11 | 22 | 39.0 | 39.0 |
| 12 | 22 | 23.4 | 54.6 |

Common conditions:
0.5 wt. part of paraffin
2 wt. parts of ethylene thiourea

Table 9

| Adhesive composition combination of samples | No.5/No.9 | No.6/No.10 | No.7/No.11 | No.8/No.12 |
|---|---|---|---|---|
| Tensile strength (kg/cm$^2$) 10 min. | 40 | 53 | 32 | 62 |
| 24 hrs. | 295 | 270 | 290 | 275 |
| Impact strength (kg/cm/cm$^2$) 24 hrs. | 12.5 | 16.3 | 13.0 | 20.0 |
| Peeling strength (kg/25 mm) 24 hrs. | 6.3 | 6.5 | 7.2 | 9.0 |

When the samples Nos. 9, 10, 11 and 12 were respectively stored at 10° C, the gel caused by the phase separation was not found for 2 months.

When the same samples were respectively stored at 30° C, the increase of viscosity was not found for 2 months.

When the ABS graft copolymer or the MBAS graft copolymer was used instead of the NBR, the adhesive compositions also imparted high hardening speed and high adhesive strength.

When a graft copolymer of butadiene-styrene and methyl methacrylate (B : S : MMA = 42.1 : 32.0 : 25.9) was used instead of the NBR copolymer, the adhesive composition also imparted high hardening speed and high adhesive strength.

EXAMPLE 7

In the example, the types of organic peroxides were studied.

In accordance with the process of Example 1, each of various organic peroxides were added to a viscous liquid containing 16.4 wt. parts of the NBR (Hycar 1072), 25.1 wt. parts of MMA, and 58.5 wt. parts of 2-HEMA to prepare each oxidizing system of the adhesive composition. The solution (p-2) was used as the reducing system of the adhesive composition. The lap shear strengths of the adhesive compositions were measured to study the hardening speed.

Table 10

| Type of Organic peroxide | Amount (wt. part) | Tensile strength (kg/cm²) 10 min. | 24 hrs. |
|---|---|---|---|
| cumene hydroperoxide | 8 | 129 | 299 |
|  | 5 | 115 | 305 |
| diisopropyl benzene hydroperoxide | 8 | 10 | 165 |
| paramenthane hydroperoxide | 8 | 10 | 183 |
| benzoyl peroxide | 8 | no hardening | no hardening |
| di-t-butyl peroxide | 8 | " | " |
| dicumyl peroxide | 8 | " | 86 |
| methyl ethyl ketone peroxide | 8 | " | 12 |

When the hydroperoxides used in the invention were used, the hardening speeds were higher than those of the other peroxides, and the adhesive strengths after 24 hours were remarkably high.

EXAMPLE 8

In the example, the combination of the redox catalyst in the invention was compared with the combination of the catalyst used in the conventional one, whereby the advantage of the use of hydroperoxide was shown.

The sample No. 4 of Example 4 was used as the oxidizing system of the adhesive composition of the invention. The reference sample No. 1 which was prepared by adding 1 wt. part of dimethyl p-toluidine to the components of the sample No. 4 (the elastomer and the vinyl monomers) was used as the reference example.

Table 11

| Adhesive composition: | Sample No.4 | Reference sample No.1 BPO/methylene chloride solution |
|---|---|---|
| Redox catalyst solution: | p-2 | (10 wt.%) |
| Tensile strength (kg/cm²) 10 min. | 129 | 120 |
| 24 hrs. | 299 | 301 |
| Impact strength | | |

Table 11-continued

| Adhesive composition: | Sample No.4 | Reference sample No.1 BPO/methylene chloride solution (10 wt.%) |
|---|---|---|
| Redox catalyst solution: | p-2 | |
| (kg cm/cm²) 24 hrs. | 23 | 4 |
| Peeling strength (kg/25 mm) 24 hrs. | 10 | 1 |

When benzoyl peroxide was used as the organic peroxide and dimethyl-p-toludine was used as the reducing agent of the redox catalyst in the components of the elastomer and the monomers of the invention, the hardening speed could be the same with that of the invention using the hydroperoxide and tetramethyl thiourea. However, the impact strength and the peeling strength required for the adhesive composition were remarkably inferior.

EXAMPLE 9

In the example, the Har.time of the adhesive compositions using 2-HPMA were shown.

The Har.time was measured as set forth in Example 1. The components of the adhesive compositions are shown in Table 12 and the results are shown in Table 13.

Table 12

| Sample No. | MMA (wt. part) | 2-HPMA (wt. part) | MMA 2-HPMA | CHP (wt. part) | ethylene thiourea (wt. part) |
|---|---|---|---|---|---|
| i | 42.5 | 42.5 | 50/50 | 8 | — |
| j | 25.5 | 59.5 | 30/70 | 8 | — |
| i' | 42.5 | 42.5 | 50/50 | — | 2 |
| j' | 25.5 | 59.5 | 30/70 | — | 2 |

Common conditions:
15 wt. parts pf butadiene-nitrile rubber (Hycar 1072)
0.3 wt. part of paraffin.

Table 13

| Adhesive compositon combinaton | Har.time (min.) |
|---|---|
| NOi / NOi' | 20 |
| NOj / NOj' | 30 |

EXAMPLE 10

In the example, the effects of the types of methacrylic acid esters were studied. The Har.time was measured as set forth in Example 1

The components of the adhesive compositions are shown in Table 14 and the results are shown in Table 15.

Table 14

| Sample No. | Alkyl methacrylate Type | Amount (wt.part) | 2-HEMA (wt.part) | CHP (wt.part) | ethylene thiourea (wt.part) |
|---|---|---|---|---|---|
| l | MMA | 25.5 | 59.5 | 8 | — |
| m | EMA | " | " | 8 | — |
| n | BMA | " | " | 8 | — |
| l' | MMA | 25.5 | 59.5 | — | 2 |
| m' | EMA | " | " | — | 2 |
| n' | BMA | " | " | — | 2 |

MMA: methyl methacrylate
EMA: ethyl methacrylate
BMA: butyl methacrylate
Common conditions:
15 wt. parts of butadiene-nitrile rubber (Hycar 1072)
0.3 wt. part of paraffin

Table 15

| Adhesive composition combination | Set time (min.) |
| --- | --- |
| NO.l / NO.l' | 5 |
| NO.m / NO.m' | 10 |
| NO.n /NO.n' | 30 |

When the alkyl methacrylates having the alkyl group of more than 4 of carbon atoms such as 2-ethyl hexyl, lauryl, tridecyl and stearyl were used in the formula of Table 14, the adhesive compositions could not be hardened, and the hardening speeds were remarkably slow in the condition exposing to air.

EXAMPLE 11

The components shown in Table 16 were mixed to prepare the oxidizing systems (sample No. o and p) and the reducing systems (samples No. o' and p'), which were mixed in each combination as shown in Table 17. Each mixture was coated on two sheets of iron plates to bond them. The lap shear strengths at 20° C at the specific periods after the bonding are shown in Table 17.

The adhesive composition prepared by mixing the sample No. 0' and the sample No. p' had superior lap shear strength to that of the adhesive composition prepared by mixing the sample No. o and the sample No. p for a short period.

Table 16

| Sample | Composition (wt. part) | | | |
| --- | --- | --- | --- | --- |
|  | o | o' | p | p' |
| Butadiene-nitrile rubber (Hycar 1072) | 300 | 300 | 300 | 300 |
| MMA | 700 | 490 | 700 | 490 |
| 2-HEMA | — | 210 | — | 210 |
| Cumene hydroperoxide | 10 | 10 | — | — |
| Cobalt naphthenate | — | — | 10 | 10 |

Table 17

| | Adhesive strength to time lap shear strength (kg/cm$^2$) | |
| --- | --- | --- |
| | sample o / sample p | sample o' / sample p' |
| 10 min. | 0 | 0 |
| 15 min. | 20 | 30 |
| 30 min. | 50 | 100 |
| 1 hour | 80 | 150 |
| 3 hours | 120 | 205 |
| 24 hours | 200 | 240 |

What is claimed is:

1. An adhesive composition which comprises a redox system comprising a reducing system containing a reducing agent and an oxidizing system comprising a. 5 to 30 wt. parts of an elastomer of a copolymer of butadiene and acrylonitrile or a copolymer of butadiene and acrylonitrile and less than 5 wt. % of a functional monomer or a graft copolymer of butadiene and at least one of acrylonitrile, styrene and methacrylic acid ester and b. 70 to 95 wt. parts of a monomer mixture comprising 30 to 80 wt. % of 2-hydroxy ethyl methacrylate or 2-hydroxy propyl methacrylate and 20 to 70 wt. % of a $C_{1-4}$ alkyl methacrylate to total monomers having ethylenically unsaturated double bond and c. 0.1 to 10 wt. % of an organic hydroperoxide to total monomers having ethylenically unsaturated double bond.

2. An adhesive composition according to claim 1, wherein said reducing system further comprises a monomer or a mixture of said elastomer or the graft copolymer and a monomer.

3. An adhesive composition according to claim 1, wherein said reducing system is applied as a solution of the reducing agent in a solvent or a plasticizer.

4. An adhesive composition according to claim 1, wherein paraffin wax is included at a ratio of 0.01 to 2 wt. % of total components.

5. An adhesive composition according to claim 1, wherein a polymerization inhibitor is included at a ratio of 0.01 to 3 wt. % to total monomers having ethylenically unsaturated double bond.

6. An adhesive composition according to claim 1, wherein said monomer mixture comprises the other monomer at a ratio of less than 50 wt. % to total monomers.

7. An adhesive composition according to claim 1, wherein said graft copolymer (a) is a graft copolymer of butadiene, styrene and acrylonitrile.

8. An adhesive composition according to claim 1, wherein said graft copolymer (a) is a graft copolymer of butadiene, styrene and methacrylic acid ester.

9. An adhesive composition according to claim 1, wherein said graft copolymer is a graft copolymer of butadiene, styrene and methacrylic acid ester.

10. An adhesive composition according to claim 1, wherein said alkyl methacrylate is methyl methacrylate.

11. An adhesive composition according to claim 4, wherein said paraffin has a melting point of 40° to 60° C.

12. An adhesive composition according to claim 1, wherein said reducing system is applied on a substrate before applying said oxidizing system.

13. An adhesive composition according to claim 1, wherein said reducing system is mixed with said oxidizing system just before or during the bonding operation.

14. An adhesive composition according to claim 1 wherein said reducing agent is a thioamide.

* * * * *